United States Patent
Natsui et al.

(10) Patent No.: US 12,322,798 B2
(45) Date of Patent: Jun. 3, 2025

(54) POSITIVE ELECTRODE ACTIVE MATERIAL FOR SECONDARY BATTERY, AND SECONDARY BATTERY

(71) Applicant: Panasonic Intellectual Property Management Co., Ltd., Osaka (JP)

(72) Inventors: Ryuichi Natsui, Osaka (JP); Mitsuhiro Hibino, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 503 days.

(21) Appl. No.: 17/773,435

(22) PCT Filed: Oct. 13, 2020

(86) PCT No.: PCT/JP2020/038575
§ 371 (c)(1),
(2) Date: Apr. 29, 2022

(87) PCT Pub. No.: WO2021/085113
PCT Pub. Date: May 6, 2021

(65) Prior Publication Data
US 2022/0407061 A1   Dec. 22, 2022

(30) Foreign Application Priority Data
Oct. 30, 2019   (JP) ................. 2019-197818

(51) Int. Cl.
*H01M 4/505*   (2010.01)
*C01G 53/50*   (2025.01)
*H01M 4/525*   (2010.01)
H01M 4/02    (2006.01)
H01M 10/0525   (2010.01)

(52) U.S. Cl.
CPC ............ *H01M 4/505* (2013.01); *C01G 53/50* (2013.01); *H01M 4/525* (2013.01); *C01P 2002/52* (2013.01); *C01P 2006/40* (2013.01); *H01M 2004/028* (2013.01); *H01M 10/0525* (2013.01)

(58) Field of Classification Search
None
See application file for complete search history.

(56) References Cited

U.S. PATENT DOCUMENTS

| 2015/0104707 A1 | 4/2015 | Park et al. |
| 2016/0028074 A1 | 1/2016 | Sugiura |
| 2019/0088940 A1 | 3/2019 | Ceder et al. |

FOREIGN PATENT DOCUMENTS

| CN | 105304891 A | 2/2016 |
| EP | 3486980 A1 | 5/2019 |
| JP | 2016-524275 A | 8/2016 |
| JP | 6387054 B2 | 9/2018 |
| JP | 2018-535904 A | 12/2018 |
| WO | 2014/007360 A1 | 1/2014 |
| WO | 2018/187531 A1 | 10/2018 |

OTHER PUBLICATIONS

English Translation of Search Report dated Jun. 10, 2023, issued in counterpart CN Application No. 202080076257.9 (3 pages).
International Search Report dated Dec. 22, 2020, issued in counterpart International application No. PCT/JP2020/038575, with English translation. (5 pages).

*Primary Examiner* — Laura Weiner
(74) *Attorney, Agent, or Firm* — WHDA, LLP

(57) ABSTRACT

This positive electrode active material is for a secondary battery and contains a lithium transition metal complex oxide. The lithium transition metal complex oxide is represented by general formula $Li_xMn_yNi_zSb_aO_bF_c$ ($x+y+z+a \leq b+c=2$, $1 \leq x \leq 1.2$, $0.4 \leq y \leq 0.8$, $0 \leq z \leq 0.4$, $0 < a < 0.01$, and $1.8 < b < 2$ are satisfied) and does not include Co.

2 Claims, 1 Drawing Sheet

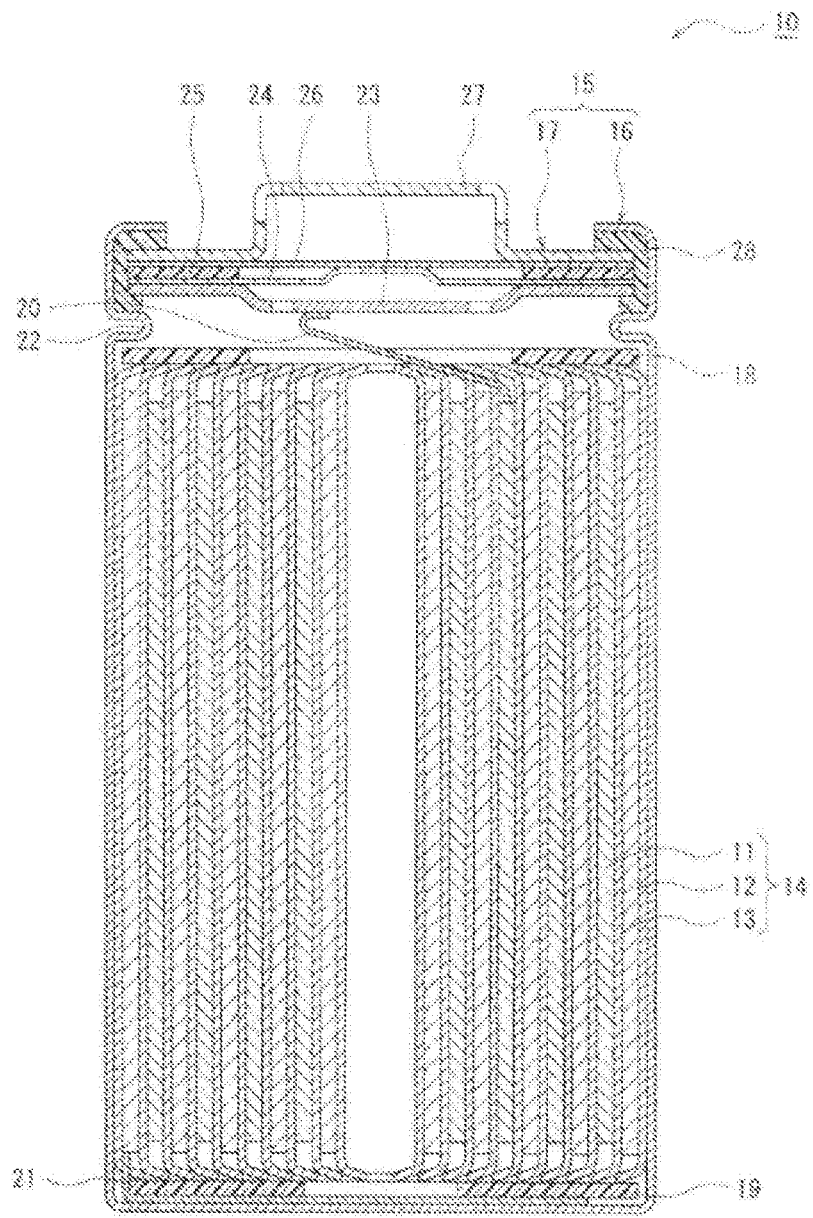

POSITIVE ELECTRODE ACTIVE MATERIAL FOR SECONDARY BATTERY, AND SECONDARY BATTERY

CROSS-REFERENCE TO RELATED APPLICATIONS

This application is a national stage of International Application No. PCT/JP2020/038575, filed Oct. 13, 2020, which claims priority to Japanese Patent Application No. 2019-197818 filed Oct. 30, 2019 both of which are hereby incorporated by reference in their entirety.

TECHNICAL FIELD

The present disclosure relates to a positive electrode active material for a secondary battery, and a secondary battery in which the positive electrode active material is used.

BACKGROUND

Conventionally, lithium-transition metal composite oxides have been widely used as a positive electrode active material for a secondary battery such as a lithium ion battery. For example, Patent Literature 1 proposes a lithium-excess-type lithium-transition metal composite oxide including no Co. In the present description, a lithium-transition metal composite oxide in which the molar ratio of lithium to metals other than lithium (Me) in the lithium-transition metal composite oxide (Li/Me) is 1 or more is described as a lithium-excess-type lithium-transition metal composite oxide.

CITATION LIST

Patent Literature

Patent Literature 1: JP 6387054 B2

SUMMARY

The lithium-excess-type lithium-transition metal composite oxide including no Co has a problem of deterioration of the load characteristics of the secondary battery.

A positive electrode active material for a secondary battery of an aspect of the present disclosure includes a lithium-transition metal composite oxide, and the lithium-transition metal composite oxide is represented by the general formula $Li_xMn_yNi_zSb_aO_bF_c$ wherein $x+y+z+a\le b+c=2$, $1\le x\le 1.2$, $0.4\le y\le 0.8$, $0\le z\le 0.4$, $0<a<0.01$, and $1.8<b<2$ are satisfied, and the lithium-transition metal composite oxide includes no Co.

A secondary battery of an aspect of the present disclosure includes a positive electrode including the positive electrode active material, a negative electrode, and an electrolyte.

According to the positive electrode active material for a secondary battery of an aspect of the present disclosure, it is possible to suppress deterioration of the load characteristics of the secondary battery.

BRIEF DESCRIPTION OF DRAWINGS

FIG. 1 is a sectional view of a secondary battery of an example of an embodiment.

DESCRIPTION OF EMBODIMENTS

A positive electrode active material for a secondary battery of an aspect of the present disclosure includes a lithium-transition metal composite oxide, and the lithium-transition metal composite oxide is represented by the general formula $Li_xMn_yNi_zSb_aO_bF_c$ wherein $x+y+z+a\le b+c=2$, $1\le x\le 1.2$, $0.4\le y\le 0.8$, $0\le z\le 0.4$, $0<a<0.01$, and $1.8<b<2$ are satisfied, and the lithium-transition metal composite oxide includes no Co. In general, a lithium-excess-type lithium-transition metal composite oxide including no Co has low stability of its crystal structure and low electron conductivity, and therefore the load characteristics of the secondary battery tend to deteriorate. However, it is considered that although the lithium-transition metal composite oxide represented by the above-described general formula is a lithium-excess-type lithium-transition metal composite oxide including no Co, deterioration of the load characteristics of the secondary battery is suppressed because the lithium-transition metal composite oxide has high stability of its crystal structure and high electron conductivity. In particular, it is presumed that the improvement in the stability of the crystal structure of the composite oxide is greatly affected by a predetermined amount of F atoms included in the composite oxide, and it is presumed that the improvement in the electron conductivity of the composite oxide is greatly affected by a predetermined amount of Sb atoms included in the composite oxide.

Hereinafter, an example of a secondary battery of an aspect of the present disclosure will be described.

FIG. 1 is a sectional view of a secondary battery of an example of an embodiment. A secondary battery 10 shown in FIG. 1 includes a wound electrode assembly 14 in which a positive electrode 11 and a negative electrode 12 are wound with a separator 13 interposed therebetween, an electrolyte, insulating plates 18 and 19 disposed on the upper and lower sides of the electrode assembly 14 respectively, and a battery case 15 housing the above-described members. The battery case 15 includes a bottomed cylindrical case body 16 and a sealing assembly 17 that seals an opening of the case body 16. Instead of the wound electrode assembly 14, an electrode assembly having another form, such as a stacked electrode assembly in which positive electrodes and negative electrodes are alternately stacked with separators interposed therebetween, may be applied. Examples of the battery case 15 include metal cases having a cylindrical shape, a square shape, a coin shape, a button shape, or the like, and resin cases (so-called laminated cases) formed by lamination with a resin sheet.

The electrolyte may be an aqueous electrolyte, but is preferably a non-aqueous electrolyte containing a non-aqueous solvent and an electrolyte salt dissolved in the non-aqueous solvent. As the non-aqueous solvent, for example, esters, ethers, nitriles, amides, and mixed solvents of two or more thereof are used. The non-aqueous solvent may contain a halogen-substituted solvent in which at least a part of hydrogen in a solvent described above is substituted with a halogen atom such as fluorine. As the electrolyte salt, for example, a lithium salt such as $LiPF_6$ is used. The electrolyte is not limited to a liquid electrolyte, and may be a solid electrolyte in which a gel polymer or the like is used.

The case body 16 is, for example, a bottomed cylindrical metal container. A gasket 28 is provided between the case body 16 and the sealing assembly 17 to ensure the sealability inside the battery. The case body 16 has an inward protrusion 22 in which, for example, a part of the side part of the case body 16 protrudes inward to support the sealing assembly 17. The inward protrusion 22 is preferably formed in an annular shape along the circumferential direction of the case body 16, and supports the sealing assembly 17 on its upper surface.

The sealing assembly 17 has a structure in which a filter 23, a lower vent member 24, an insulating member 25, an upper vent member 26, and a cap 27 are stacked in this order from the electrode assembly 14 side. Each member included in the sealing assembly 17 has, for example, a disk shape or a ring shape, and the members excluding the insulating member 25 are electrically connected to each other. The lower vent member 24 and the upper vent member 26 are connected to each other at their central parts, and an insulating member 25 is interposed between the circumferential parts of the lower vent member 24 and the upper vent member 26. When the internal pressure of the secondary battery 10 increases due to heat generated by an internal short circuit or the like, for example, the lower vent member 24 deforms so as to push the upper vent member 26 up toward the cap 27 side and breaks, and thus the current pathway between the lower vent member 24 and the upper vent member 26 is cut off. When the internal pressure further increases, the upper vent member 26 breaks, and gas is discharged from an opening of the cap 27.

In the secondary battery 10 shown in FIG. 1, a positive electrode lead 20 attached to the positive electrode 11 extends to the sealing assembly 17 side through a through hole of the insulating plate 18, and a negative electrode lead 21 attached to the negative electrode 12 extends to the bottom side of the case body 16 through the outside of the insulating plate 19. The positive electrode lead 20 is connected to the lower surface of the filter 23, which is the bottom plate of the sealing assembly 17, by welding or the like, and the cap 27, which is electrically connected to the filter 23 and is the top plate of the sealing assembly 17, serves as a positive electrode terminal. The negative electrode lead 21 is connected to the inner surface of the bottom of the case body 16 by welding or the like, and the case body 16 serves as a negative electrode terminal.

Hereinafter, the positive electrode 11, the negative electrode 12, and the separator 13 will be described in detail.

[Positive Electrode]

The positive electrode 11 includes a positive electrode core and a positive electrode mixture layer provided on a surface of the positive electrode core. As the positive electrode core, a foil of a metal, such as aluminum, that is stable in a potential range of the positive electrode 11, a film in which the metal is disposed on its surface layer, or the like can be used. The positive electrode mixture layer includes a positive electrode active material, a binder, and a conductive agent, and is preferably provided on both surfaces of the positive electrode core excluding a portion to which the positive electrode lead 20 is connected. The positive electrode 11 can be produced by, for example, applying a positive electrode mixture slurry including a positive electrode active material, a binder, a conductive agent, and the like to the surface of a positive electrode core, drying the applied film, and then compressing the film to form a positive electrode mixture layer on both surfaces of the positive electrode core.

Examples of the conductive agent included in the positive electrode mixture layer include carbon materials such as carbon black, acetylene black, Ketjenblack, and graphite. Examples of the binder included in the positive electrode mixture layer include fluororesins such as polytetrafluoroethylene (PTFE) and polyvinylidene fluoride (PVdF), polyacrylonitrile (PAN), polyimides, acrylic resins, and polyolefins. These resins may be used in combination with a cellulose derivative such as carboxymethyl cellulose (CMC) or its salt, polyethylene oxide (PEO), or the like.

The positive electrode active material includes a lithium-transition metal composite oxide. The lithium-transition metal composite oxide is represented by the general formula $Li_xMn_yNi_zSb_aO_bF_c$ wherein $x+y+z+a \leq b+c=2$, $1 \leq x \leq 1.2$, $0.4 \leq y \leq 0.8$, $0 \leq z \leq 0.4$, $0 < a < 0.01$, and $1.8 < b < 2$ are satisfied, and the lithium-transition metal composite oxide includes no Co. In the general formula, the maximum value of $x+y+z+a$ is 2, and x is 1 or more and 1.2 or less. Therefore, in the lithium-transition metal composite oxide, the molar ratio of Li to metals other than Li (Me) in the lithium-transition metal composite oxide (Li/Me) is 1 or more, and the lithium-transition metal composite oxide is a Li-excess-type composite oxide.

The positive electrode active material desirably includes the lithium-transition metal composite oxide (hereinafter, referred to as "composite oxide A") as a main component. The main component refers to a component that is included at the largest content among components in the positive electrode active material. The content of the composite oxide A in the positive electrode active material is, for example, preferably 50 mass % or more, more preferably 90 mass % or more, and still more preferably 100 mass %. The positive electrode active material may include a compound other than the composite oxide A as long as an effect of the present disclosure is not impaired.

The composite oxide A preferably has a crystal structure of an O2 structure. The proportion of the O2 structure is, for example, preferably 50 vol % or more, more preferably 90 vol % or more, still more preferably 98 vol % or more, and still even more preferably 100 vol % in the crystal structure of the composite oxide A from the viewpoint of stability of the crystal structure and the like. Here, the O2 structure is a layered crystal structure in which lithium exists at the center of an oxygen octahedron and one unit cell has two kinds of overlapping forms between oxygen and a transition metal, and belongs to a space group $P6_3mc$.

The composite oxide A may include a composite oxide having a T2 structure or an O6 structure synthesized as a by-product during synthesis of the composite oxide A. Here, the T2 structure is a layered crystal structure in which lithium exists at the center of an oxygen tetrahedron and one unit cell has two kinds of overlapping forms between oxygen and a transition metal, and belongs to a space group Cmca. The O6 structure is a layered crystal structure in which lithium exists at the center of an oxygen octahedron and one unit cell has six kinds of overlapping forms between oxygen and a transition metal, and belongs to a space group R-3m.

In the general formula of the composite oxide A, a indicating the content of Sb is to satisfy $0<a<0.01$, and preferably satisfies $0.002 \leq a \leq 0.005$. If the predetermined amount of Sb is included in the composite oxide A, for example, the electron conductivity of the composite oxide A is improved, and deterioration of the load characteristics of the secondary battery is suppressed. If a is 0.01 or more, for example, the diffusibility of lithium ions in the composite oxide A deteriorates, and it is not possible to sufficiently suppress deterioration of the load characteristics of the secondary battery.

In the general formula of the composite oxide A, c indicating the content of F is to satisfy $0<c \leq 0.2$, and preferably satisfies $0.02 \leq c \leq 0.1$. If the predetermined amount of F is included in the composite oxide A, for example, the stability of the crystal structure of the composite oxide A is improved, and deterioration of the load characteristics of the secondary battery is suppressed.

In the general formula of the composite oxide A, y indicating the content of Mn is to satisfy $0.4 \le y \le 0.8$ from the viewpoint of suppressing deterioration of the load characteristics of the secondary battery, and preferably satisfies $0.6 \le y \le 0.7$, for example, from the viewpoint of increasing the capacity of the secondary battery. In the general formula of the composite oxide A, z indicating the content of Ni is to satisfy $0 \le z \le 0.4$ from the viewpoint of suppressing deterioration of the load characteristics of the secondary battery, and preferably satisfies $0.3 \le z \le 0.4$, for example, from the viewpoint of increasing the capacity of the secondary battery. In the general formula of the composite oxide A, x indicating the content of Li is to satisfy $1 \le x \le 1.2$ from the viewpoint of suppressing deterioration of the load characteristics of the secondary battery, and preferably satisfies $1.1 \le x \le 1.15$, for example, from the viewpoint of suppressing deterioration of the charge-discharge cycle characteristics of the secondary battery.

The composite oxide A represented by the above-described general formula may include a metal element other than Li, Mn, Ni, Sb, and Co. However, the molar ratio of Li to metals other than Li (Me) in the composite oxide A (Li/Me) is 1 or more. The metal element other than Li, Mn, Ni, Sb, and Co is, for example, preferably at least one selected from Fe, Ti, Bi, and Nb. Among them, Ni and Fe are preferable.

The amount of each component included in the composite oxide A is measured by inductively coupled plasma (ICP) emission spectroscopic analysis.

The composite oxide A is manufactured by, for example, adding and mixing raw materials such as a Li compound, a Mn compound, a Ni compound, a Sb compound, and a F compound so as to obtain a predetermined molar ratio, crushing and mixing the obtained mixture by a mechanochemical treatment, and calcinating the mixture after the crushing and mixing. The calcinating temperature of the mixture is preferably in the range of 700° C. or more and 900° C. or less. The calcinating atmosphere is preferably an oxygen atmosphere or the air. The composite oxide A may be manufactured by calcinating the mixture obtained by adding and mixing the raw materials without a mechanochemical treatment. In the synthesized composite oxide A, a part of Sb is sometimes not solid-solved and remains as an oxide on the particle surface of the composite oxide A, and this Sb is also an element included in the composite oxide A. In a method of synthesizing the composite oxide A, a mechanochemical treatment is desirably performed from the viewpoint of easily solid-solving Sb.

The Li compound is not particularly limited, and examples of the Li compound include Li oxides, Li carbonates, and Li hydroxides. The same applies to the Mn compound, the Ni compound, the Sb compound, and the F compound. Each raw material may be a composite oxide, a composite hydroxide, a composite carbonate, or the like including at least two selected from Li, Mn, Ni, Sb, and F.

[Negative Electrode]

The negative electrode 12 includes a negative electrode core and a negative electrode mixture layer provided on a surface of the negative electrode core. As the negative electrode core, a foil of a metal, such as copper, that is stable in a potential range of the negative electrode 12, a film in which the metal is disposed on its surface layer, or the like can be used. The negative electrode mixture layer includes a negative electrode active material and a binder, and is preferably provided, for example, on both surfaces of the negative electrode core excluding a portion to which the negative electrode lead 21 is connected. The negative electrode 12 can be produced by, for example, applying a negative electrode mixture slurry including a negative electrode active material, a binder, and the like to the surface of a negative electrode core, drying the applied film, and then compressing the film to form a negative electrode mixture layer on both surfaces of the negative electrode core.

The negative electrode active material is not particularly limited as long as it is, for example, a material capable of reversibly occluding and releasing lithium ions, and preferably includes a carbon-based active material. Suitable carbon-based active materials are graphite such as natural graphite such as flake graphite, massive graphite, and amorphous graphite and artificial graphite such as massive artificial graphite (MAG) and graphitized mesophase-carbon microbead (MCMB). The negative electrode active material may include a Si-based active material including at least one of Si or a Si-containing compound.

As the binder, fluororesins, PAN, polyimides, acrylic resins, polyolefins, and the like can be used as in the case of the positive electrode 11, but styrene-butadiene rubber (SBR) is preferably used. The negative electrode mixture layer preferably further includes CMC or its salt, polyacrylic acid (PAA) or its salt, polyvinyl alcohol (PVA), or the like. Among them, CMC or its salt, or PAA or its salt is preferably used in combination with SBR.

[Separator]

As the separator 13, for example, a porous sheet having an ion permeation property and an insulating property is used. Specific examples of the porous sheet include fine porous thin films, woven fabrics, and nonwoven fabrics. As a material of the separator 13, polyolefins such as polyethylene and polypropylene, cellulose, and the like are suitable.

The separator 13 may have a single-layered structure or a multilayered structure. On a surface of the separator 13, a heat-resistant layer or the like may be formed.

EXAMPLES

Hereinafter, the present disclosure will be further described with reference to Examples, but the present disclosure is not limited to these Examples.

Example 1

[Synthesis of Positive Electrode Active Material]

$LiMnO_2$, $Li_2MnO_3$, $LiNiO_2$, LiF, and $Sb_2O_3$ were mixed so as to obtain a stoichiometric ratio of 0.033:0.3:0.3:0.05:0.001, and the mixture was put into a zirconia pot having an internal volume of 45 cc and containing zirconia balls having a diameter of 5 mm. This pot was set in a planetary ball mill (trade name "PLP-7" manufactured by Fritsch GmbH), and the mixture was crushed and mixed at a revolution speed of 600 rpm for 35 hours. The mixture was put into a calcinating furnace and calcinated at 800° C. for 1 hour in the air to obtain a positive electrode active material.

The composition of the obtained positive electrode active material was analyzed using an inductively coupled plasma (ICP) emission spectroscopic analysis device (trade name "iCAP6300" manufactured by Thermo Fisher Scientific Inc.), and the result was $Li_{1.167}Mn_{0.554}Ni_{0.277}Sb_{0.002}O_{1.95}F_{0.05}$.

[Production of Positive Electrode]

The positive electrode active material, acetylene black, and polyvinylidene fluoride (PVdF) were mixed at a mass ratio of 92:5:3, and N-methyl-2-pyrrolidone (NMP) was used as a dispersion medium to prepare a positive electrode mixture slurry. Next, the positive electrode mixture slurry was applied to the surface of a positive electrode core formed using an aluminum foil, the applied film was dried and compressed, and then the resulting product was cut into a predetermined electrode size to produce a positive electrode in which a positive electrode mixture layer was formed on the positive electrode core.

[Preparation of Non-Aqueous Electrolyte Liquid]

In a mixed solvent obtained by mixing fluoroethylene carbonate (FEC) and methyl 3,3,3-trifluoropropionate (FMP) at a mass ratio of 1:3, $LiPF_6$ was dissolved at a concentration of 1 mol/L to prepare a non-aqueous electrolyte liquid.

[Production of Test Cell]

A lead wire was attached to each of the positive electrode and the counter electrode including a Li metal, and the positive electrode and the counter electrode were disposed to face each other with a separator including polyolefin interposed therebetween to produce an electrode assembly. The electrode assembly and the non-aqueous electrolyte liquid were enclosed in an exterior body formed using an aluminum laminate film to produce a test cell.

Example 2

A positive electrode active material was synthesized in the same manner as in Example 1 except that $LiMnO_2$, $Li_2MnO_3$, $LiNiO_2$, $LiF$, and $Sb_2O_3$ were mixed so as to obtain a stoichiometric ratio of 0.033:0.3:0.3:0.05:0.0025. The composition of the obtained positive electrode active material was analyzed, and the result was $Li_{1.166}Mn_{0.553}Ni_{0.276}Sb_{0.005}O_{1.95}F_{0.05}$. Using the positive electrode active material, a test cell was produced in the same manner as in Example 1.

Comparative Example 1

A positive electrode active material was synthesized in the same manner as in Example 1 except that $LiMnO_2$, $Li_2MnO_3$, $LiNiO_2$, $LiF$, and $Sb_2O_3$ were mixed so as to obtain a stoichiometric ratio of 0.033:0.3:0.3:0.05:0.005. The composition of the obtained positive electrode active material was analyzed, and the result was $Li_{1.167}Mn_{0.55}Ni_{0.274}Sb_{0.01}O_{1.95}F_{0.05}$. Using the positive electrode active material, a test cell was produced in the same manner as in Example 1.

Comparative Example 2

A positive electrode active material was synthesized in the same manner as in Example 1 except that $LiMnO_2$, $Li_2MnO_3$, $LiNiO_2$, and $LiF$ were mixed so as to obtain a stoichiometric ratio of 0.033:0.3:0.3:0.05. The composition of the obtained positive electrode active material was analyzed, and the result was $Li_{1.167}Mn_{0.555}Ni_{0.278}O_{1.95}F_{0.05}$. Using the positive electrode active material, a test cell was produced in the same manner as in Example 1.

Comparative Example 3

A positive electrode active material was synthesized in the same manner as in Example 1 except that $LiMnO_2$, $Li_2MnO_3$, $LiNiO_2$, $LiF$, and $TiO_2$ were mixed so as to obtain a stoichiometric ratio of 0.033:0.3:0.3:0.05:0.005. The composition of the obtained positive electrode active material was analyzed, and the result was $Li_{1.167}Mn_{0.553}Ni_{0.276}Ti_{0.005}O_{1.95}F_{0.05}$. Using the positive electrode active material, a test cell was produced in the same manner as in Example 1.

Comparative Example 4

A positive electrode active material was synthesized in the same manner as in Example 1 except that $LiMnO_2$, $Li_2MnO_3$, $LiNiO_2$, $LiF$, and $Sr(OH)_2 \cdot 8H_2O$ were mixed so as to obtain a stoichiometric ratio of 0.033:0.3:0.3:0.05:0.005. The composition of the obtained positive electrode active material was analyzed, and the result was $Li_{1.167}Mn_{0.553}Ni_{0.276}Sr_{0.005}O_{1.95}F_{0.05}$. Using the positive electrode active material, a test cell was produced in the same manner as in Example 1.

Comparative Example 5

A positive electrode active material was synthesized in the same manner as in Example 1 except that $LiMnO_2$, $Li_2MnO_3$, $LiNiO_2$, $LiF$, and $Al(OH)_3$ were mixed so as to obtain a stoichiometric ratio of 0.033:0.3:0.3:0.05:0.002. The composition of the obtained positive electrode active material was analyzed, and the result was $Li_{1.167}Mn_{0.554}Ni_{0.277}Al_{0.002}O_{1.95}F_{0.05}$. Using the positive electrode active material, a test cell was produced in the same manner as in Example 1.

Comparative Example 6

A positive electrode active material was synthesized in the same manner as in Example 1 except that $LiMnO_2$, $Li_2MnO_3$, $LiNiO_2$, $LiF$, and $(NH_4)_2HPO_4$ were mixed so as to obtain a stoichiometric ratio of 0.033:0.3:0.3:0.05:0.01. The composition of the obtained positive electrode active material was analyzed, and the result was $Li_{1.167}Mn_{0.55}Ni_{0.274}P_{0.01}O_{1.95}F_{0.05}$. Using the positive electrode active material, a test cell was produced in the same manner as in Example 1.

[Charge and Discharge Test]

The test cell in each of Examples and Comparative Examples was charged to 4.7 V at a constant current of 0.05 C in a temperature environment of 25° C., and then discharged to 2.5 V at a constant current of 0.05 C. The discharge capacity at this time is summarized in Table 1 as a battery capacity at 0.05 C. The test cell in each of Examples and Comparative Examples was charged to 4.7 V at a constant current of 0.2 C in a temperature environment of 25° C., and then discharged to 2.5 V at a constant current of 0.2 C. The discharge capacity at this time is summarized in Table 1 as a battery capacity at 0.2 C. A smaller difference between the battery capacity at 0.05 C and the battery capacity at 0.2 C shows that deterioration of the load characteristics of the secondary battery is more suppressed.

TABLE 1

| | Positive electrode active material | Battery characteristics | |
|---|---|---|---|
| | | Battery capacity at 0.05 C | Battery capacity at 0.2 C |
| Example 1 | Sb: 0.2 mol % | 276.4 mAh/g | 257.2 mAh/g |
| Example 2 | Sb: 0.5 mol % | 275.1 mAh/g | 256.0 mAh/g |
| Comparative Example 1 | Sb: 1.0 mol % | 273.3 mAh/g | 234.6 mAh/g |
| Comparative Example 2 | — | 271.3 mAh/g | 243.9 mAh/g |
| Comparative | Ti: 0.5 mol % | 275.1 mAh/g | 250.9 mAh/g |

TABLE 1-continued

|  | Positive electrode active material | Battery characteristics | |
|---|---|---|---|
|  |  | Battery capacity at 0.05 C | Battery capacity at 0.2 C |
| Example 3 Comparative Example 4 | Sr: 0.5 mol % | 271.2 mAh/g | 247.7 mAh/g |
| Comparative Example 5 | Al: 0.2 mol % | 271.5 mAh/g | 246.1 mAh/g |
| Comparative Example 6 | P: 1.0 mol % | 271.3 mAh/g | 249.2 mAh/g |

In the test cells in Examples 1 to 2, the difference between the battery capacity at 0.05 C and the battery capacity at 0.2 C was suppressed to be small as compared with the test cells in Comparative Examples 1 to 6. Therefore, it can be said that deterioration of the load characteristics of the secondary battery was suppressed more in Examples 1 to 2 than in Comparative Examples 1 to 6.

REFERENCE SIGNS LIST

10 Secondary battery
11 Positive electrode
12 Negative electrode
13 Separator
14 Electrode assembly
15 Battery case
16 Case body
17 Sealing assembly
18, 19 Insulating plate
20 Positive electrode lead
21 Negative electrode lead
22 Inward protrusion
23 Filter
24 Lower vent member
25 Insulating member
26 Upper vent member
27 Cap
28 Gasket

The invention claimed is:

1. A positive electrode active material for a secondary battery, the positive electrode active material comprising a lithium-transition metal composite oxide,
the lithium-transition metal composite oxide represented by the general formula $Li_xMn_yNi_zSb_aO_bF_c$ wherein $x+y+z+a\leq b+c=2$, $1\leq x\leq 1.2$, $0.4\leq y\leq 0.8$, $0\leq z\leq 0.4$, $0<a<0.01$, and $1.8<b<2$ are satisfied, the lithium-transition metal composite oxide including no Co,
wherein the general formula satisfies $0.002\leq a\leq 0.005$.

2. A secondary battery comprising: a positive electrode including the positive electrode active material for a secondary battery according to claim 1; a negative electrode; and an electrolyte.

* * * * *